Figure 1:
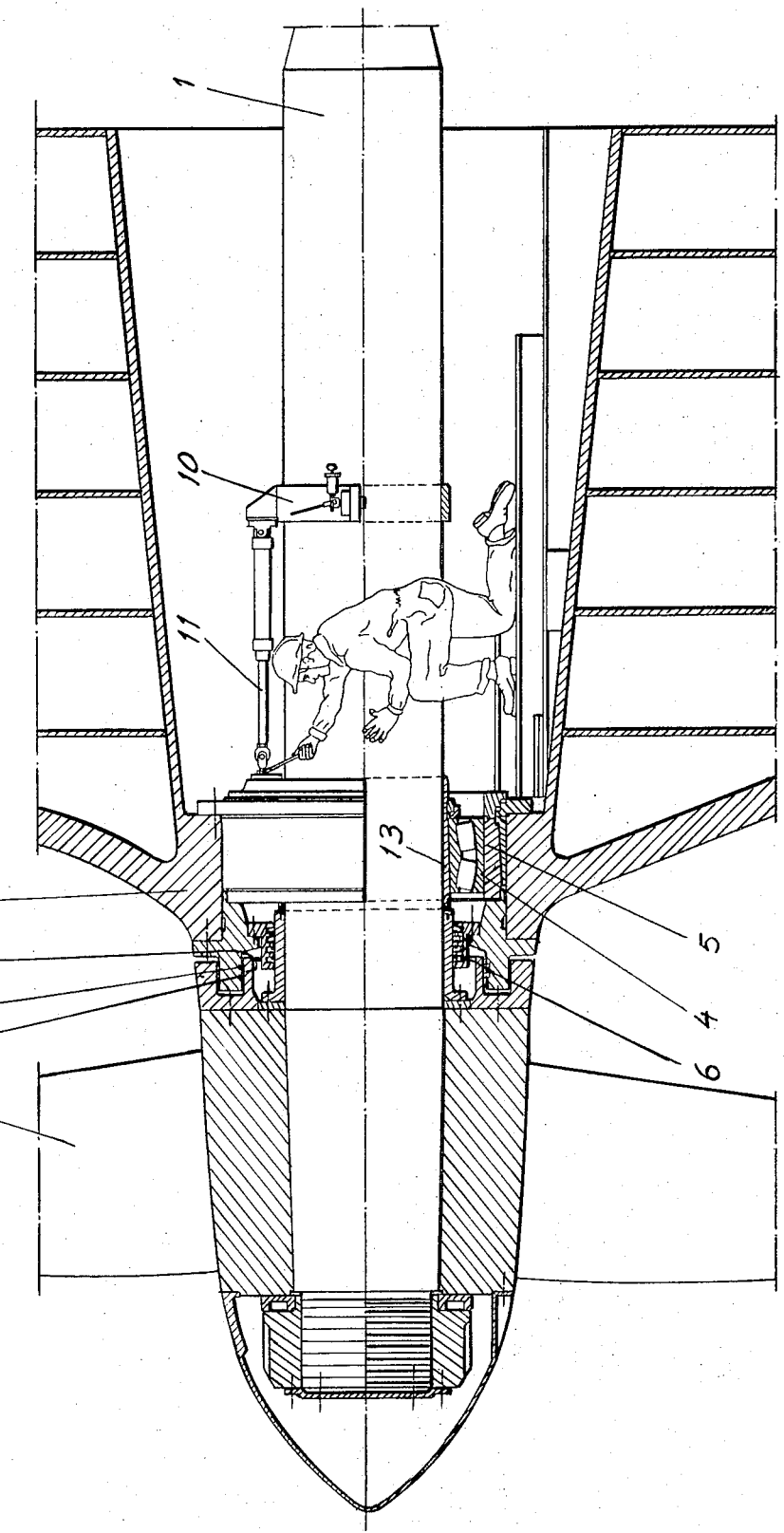

United States Patent [19]
Bergling

[11] 3,790,356
[45] Feb. 5, 1974

[54] DEVICE FOR MOUNTING AND DISMOUNTING A STERN POST BEARING

[75] Inventor: Folke Gunnar Bergling, Partille, Sweden

[73] Assignee: SKF Industrial Trading and Development Company B.V., Amsterdam, Netherlands

[22] Filed: Oct. 24, 1972

[21] Appl. No.: 301,212

[30] Foreign Application Priority Data
Dec. 22, 1971 Sweden.......................16443/71

[52] U.S. Cl............................. 29/201, 29/148.4 A
[51] Int. Cl....................... B23p 19/04, B23p 11/00
[58] Field of Search .... 29/149.5 R, 201, 149.5 NM, 29/148.4 A

[56] References Cited
UNITED STATES PATENTS
3,317,254  5/1967  Satterthwaite et al..... 29/149.5 R X
FOREIGN PATENTS OR APPLICATIONS
333,844  3/1971  Sweden................................ 29/201

Primary Examiner—Thomas H. Eager
Attorney, Agent, or Firm—Howson and Howson; Eugene E. Renz, Jr.

[57] ABSTRACT

The present invention relates to a device for mounting and dismounting a stern post bearing and possibly a seal for a propeller shaft in a vessel.

2 Claims, 3 Drawing Figures

DEVICE FOR MOUNTING AND DISMOUNTING A STERN POST BEARING

The normal procedure of inspection and replacement of stern post bearings and seals is that the ship is docked and that the propeller and propeller shaft is dismounted from outside the ship. The propeller shaft thus has to be disengaged from the outgoing driving shaft of the engine. Then the seal and the bearing can be dismounted outwards when needed.

It is also known, e.g., from the German patent publication No. 1.295.413 to mount and dismount propeller shaft bearing from inside the ship without said ship having to be docked. When the bearing is removed from the bearing seat, the propeller shaft or the propeller hub is hereby supported by a supporting surface which is situated outside the bearing seat. The supporting surface may be brought to contact a corresponding surface on the hub or shaft by the fact that the surfaces are tapered and that the propeller shaft is being displaced axially. Hereby the propeller shaft has to be disengaged from the outgoing driving shaft of the engine. Alternatively, the support may be obtained by that the stern post outside the bearing and the seal is provided with a number of radially displaceable pistons, which can be displaced for contact against the propeller shaft or the propeller hub.

Hereby no displacement of the propeller shaft is necessary in order to have it supported when the bearing is removed from the bearing seat, but this solution is complicated since a number of radially displaceable pistons have to be provided in the very bore for the propeller shaft through the hull of the ship. These pistons are also exposed to seawater, which means that they have to be made of a special and therefore expensive material. The present invention makes it possible to mount and dismount a stern post bearing and seal for a propeller shaft of a ship in a simple way without having to dock the ship and without the need of providing the boss with any special arrangement. When inspecting bearings and seals it is not necessary to disconnect the propeller shaft from the outgoing driving shaft of the engine and the propeller shaft is all the time centered in the bearing seat which means that the seals are not subjected to any strain. The characterizing features of the invention will appear in the accompanying claims.

Figure 2:
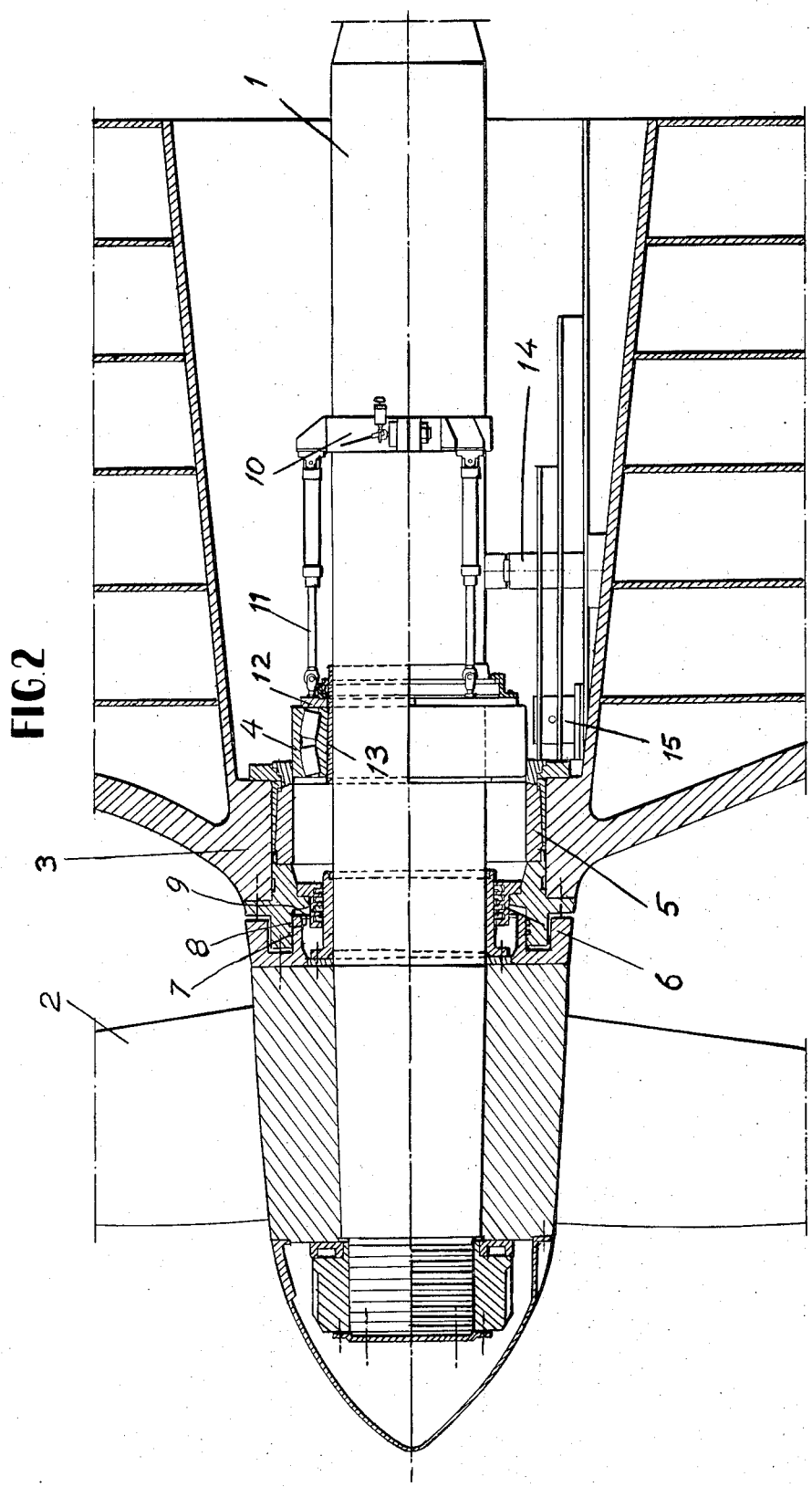
Figure 3:
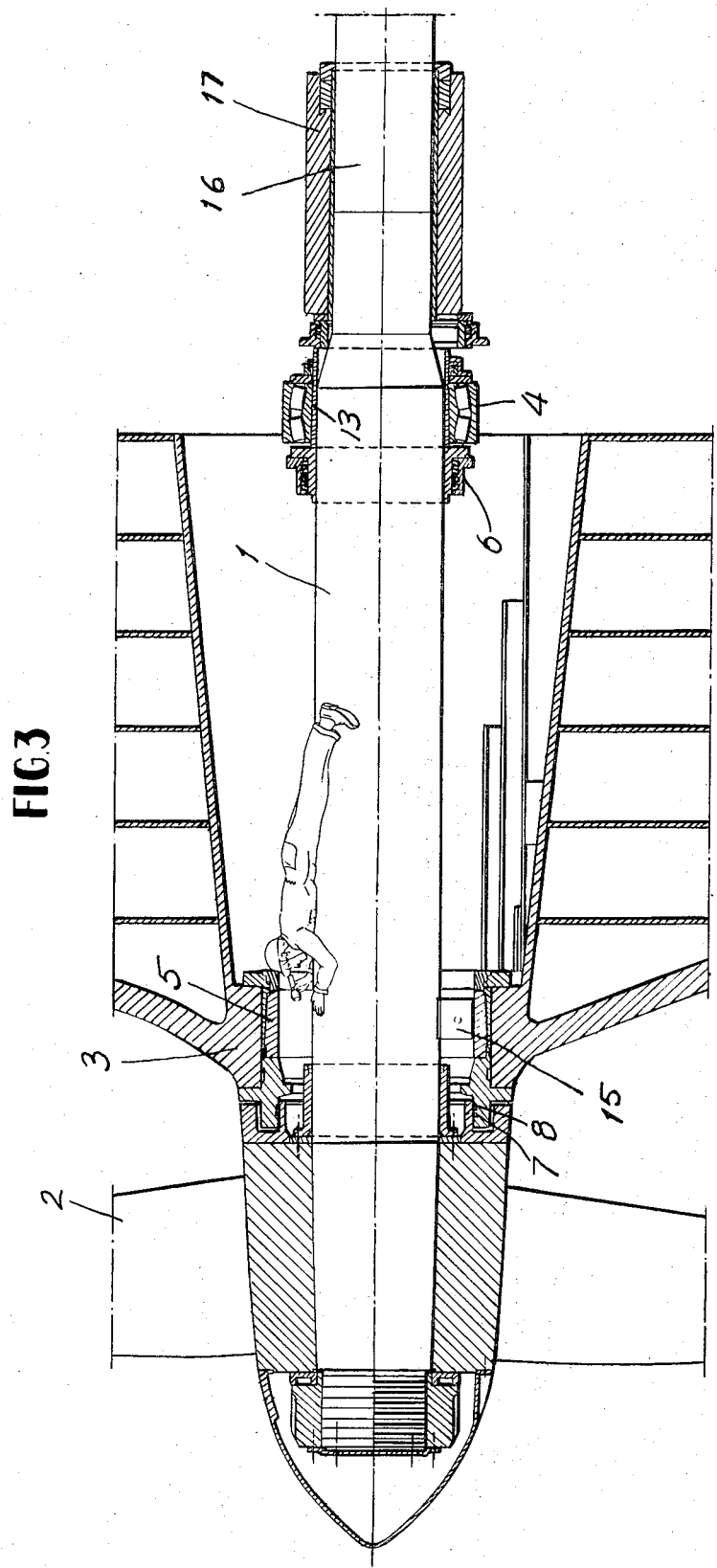

One embodiment of the invention will now be described in connection to the accompany drawing, in which FIG. 1 shows a stern post bearing ready for dismounting, FIG. 2 shows a situation where the bearing is almost completely drawn out of its seal and FIG. 3 show a situation where both the bearing and the outer seal are removed from the boss and the respective seats are inspected. FIG. 1 shows a propeller shaft 1 on which a propeller 2 is mounted. The propeller shaft is mounted in a rollbearing 4 in the boss 3, which bearing is suitably mounted with a loose fit in an expandible sleeve 5 which is fitted in the boss. The sleeve consists of two coaxial rings with tapered contact surfaces. To prevent seawater from entering the bearing a seal 6 is provided aft of the bearing.

When the bearing 4 and possibly the seal 6 are to be dismounted, seawater has to be prevented from entering the ship through the boss when the seal 6 is removed from its position in in FIG. 1 To this end a number of static auxiliary seal (7,8) are provided in the boss, e.g. in the shape of inflatable tubes which can be expanded radially by supplying compressed air through channels (not shown) and thereby be pressed against a wall 9 in the propeller hub. A puller device 10 is attached around the propeller shaft and one end of its arms is attached to the bearing unit.

In FIG. 2 it is shown how the arms are attached to a ring 12 which is screwed upon a sleeve 13 with a tapered portion on which the inner ring of the bearing, which is provided with a tapered bore, is positioned when the bearing is in a working position.

Before the bearing is dismounted the bearing is disconnected from the sleeve by a relative axial displacement, whereafter the sleeve and the bearing when unloaded may be freely moved along the propeller shaft because of the fact that the outer ring of the bearing has a loose fit in the sleeve 5 which is fitted in the boss.

In order to relieve the bearing from the load of the shaft 1 and the propeller 2 a jack 14 is provided inside the ship at a distance from the bearing seat. The jack actuates the shaft and is elongated until the bearing becomes unloaded in the sleeve 5, whereafter the puller 10, 11 is activated and the bearing and the sleeve 13 is moved forwards on the shaft.

In FIG. 2 the bearing is shown in a position where it is almost completely drawn off the seat. The jack 14 is situated at such a distance from the bearing seat that the bearing can be moved forward such a long distance that a supporting in the stern post when the above procedures are carried out, can be placed in a position in the bearing seat between theshaft and the sleeve 5 (see FIG. 3). The supporting piece has such dimensions that it precisely fits into this position when the shaft is centered, and the supporting surfaces are suitably designed so that they correspond to the envelope surface of the shaft and the bore surface of the sleeve 5. When the piece 15 is in position in the seat, the jack 14 can be removed without the shaft being lowered. The jack can be removed or diminished so much that the bearing can be moved past it on the propeller shaft.

If also the seal 6 is to be dismounted the bearing is moved past the jack, whereafter the jack is again brought into contact with the shaft 1, which is pressed upwards so that the supporting piece 15 in the bearing seat can be removed.

Thereafter the puller is placed in a position aft of the bearing and is connected to the seal 6, which is drawn into the interior of the ship.

If the seal has to be replaced, the supporting piece is again placed in the bearing seat, whereafter the jack is removed and the seal is pushed forwards on the shaft into the interior of the ship. In FIG. 3 a situation is shown in which both bearing and seal are removed form theiractive position and the bearing and seal seats are inspected. The propeller shaft is supported by the piece 15 as previously described. The bearing and the seal are situated at the forward end of the propeller shaft.

When replacing bearing and seal the shaft has to be disconnected from the outgoing driving shaft 16 or the engine by the coupling 17, here shown as a pressure oil coupling, being disconnected from the propeller shaft, one end of which is thereby left free. Thereby it may be necessary that the shaft be supported, besides by the supporting piece 15, also by another supporting means inside the ship, either above or below the shaft.

Mounting of bearing and seal is carried out in a manner corresponding to the above described dismounting operation although in reversed order, and is not described.

I claim:

1. A device for mounting and dismounting of a stern post bearing and possibly a seal for a propeller shaft in a ship, characterized by a jack situated inside the ship and intended to work on the propeller shaft for adjusting its position in the boss and a further supporting means intended to be placed under the shaft in or in connection to the bearing seat when the shaft is centered in the seat and the bearing and possibly the seal are removed from their respective seats, whereby the point of action of the jack upon the shaft is situated at such a distance from the bearing seat that the supporting means can be placed into its active position on the opposite side of the bearing and/or the seal relative to the jack when the jack is still in its working position.

2. A device according to claim 1, characterized by that the supporting means is intended to be placed in the bearing seat in its active position, whereby its surfaces which contact the shaft and the seat respectively have a shape which corresponds to the shape of the shaft and the seat respectively, and that the distance between these surfaces on the supporting means is equal to half the difference between the outer diameter and bore diameter of the stern post bearing.

* * * * *